United States Patent [19]
Redelman et al.

[11] Patent Number: 4,841,841
[45] Date of Patent: Jun. 27, 1989

[54] STEER MECHANISM FOR A STEER-BY-DRIVING VEHICLE

[75] Inventors: James A. Redelman; James W. Morrow, both of Indianapolis, Ind.

[73] Assignee: General Motors Corporation, Detroit, Mich.

[21] Appl. No.: 212,557

[22] Filed: Jun. 27, 1988

[51] Int. Cl.⁴ .......................... F15B 13/04; F15B 9/10
[52] U.S. Cl. .................................... 91/30; 91/375 R; 91/448; 60/444
[58] Field of Search ............... 91/30, 374, 375 R, 444, 91/448; 60/444; 180/6.44, 6.48

[56] References Cited

U.S. PATENT DOCUMENTS

| | | | |
|---|---|---|---|
| 3,717,212 | 2/1973 | Potter | 180/6.44 |
| 3,946,560 | 3/1976 | MacIntosh et al. | 180/6.48 X |
| 4,372,341 | 2/1983 | Crawley | 91/448 X |
| 4,458,485 | 7/1984 | Seelmann | 60/444 X |

Primary Examiner—Robert E. Garrett
Assistant Examiner—M. Williamson
Attorney, Agent, or Firm—Donald F. Scherer

[57] ABSTRACT

A steer-by-driving control for controlling a hydrostatic steering unit to permit consistent operator input during forward and reverse travel has a valve assembly including a distribution valve and a pair of sleeve valves. The sleeve valves are rotatably mounted on the distribution valve and are interconnected by a gear arrangement. One sleeve valve is rotated by the operator in response to a steer request while the other sleeve member, due to the gearing, rotates oppositely. The distribution valve member controls fluid flow through forward and reverse steer passages formed in the sleeve valves to a signal valve for distribution to a control member of a hydrostatic unit. The distribution valve member is subjected to rotary input from the hydrostatic steering unit to stop fluid flow when the proper steer position has been reached. The signal valve is positioned according to the direction of the vehicle operation to selectively send the steer signals to the proper portions of the hydrostatic control.

1 Claim, 1 Drawing Sheet

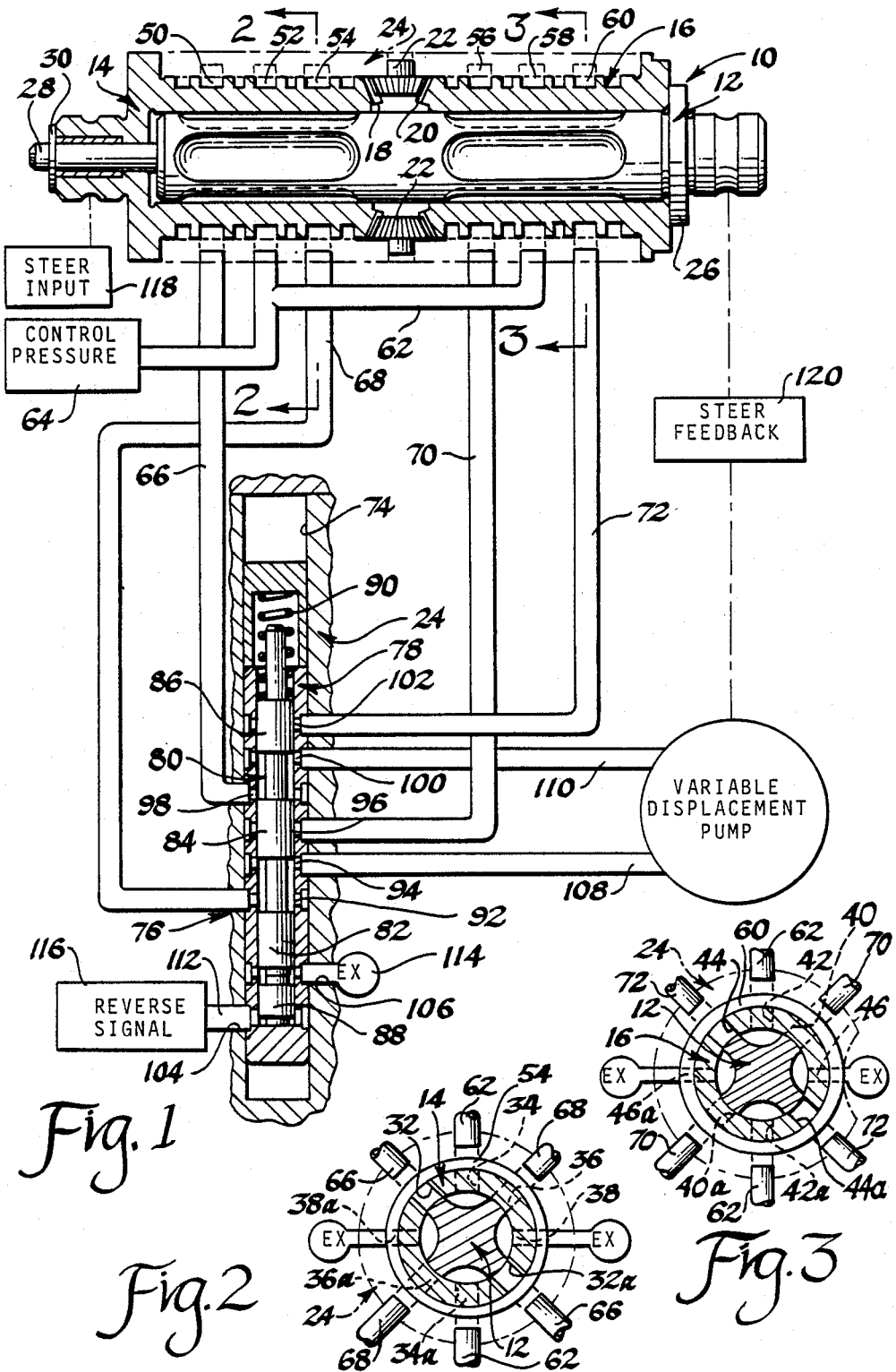

STEER MECHANISM FOR A STEER-BY-DRIVING VEHICLE

The invention herein described was made in the course of work under a contract or subcontract thereunder with the Department of the Army.

BACKGROUND OF THE INVENTION

This invention relates to hydrostatic steer controls and more particularly to rotary valve structures for such hydrostatic controls.

It is desirable in transmissions for steer-by-driving vehicles to design the steer control so that the operator uses one maneuver for a right turn and an opposite maneuver for a left turn, whether the vehicle is driving in forward or reverse. An example of a steer-by-driving transmission is shown in U.S. Pat. No. 4,614,131 issued to Hall III, Sept. 30, 1986. Prior art devices for providing similar steer control such as that shown in U.S. Pat. No. 3,717,212 to Potter, issued Feb. 20, 1973, use two distinct servo valve assemblies. One servo valve assembly controls turning during forward operation and the other controls steering during reverse operation. In Potter, the valve members are interconnected by linkages which, of course, require considerable space to accommodate the mechanical components.

SUMMARY OF THE INVENTION

The present invention provides a compact valve assembly which uses a single central distribution spool member on which is rotatably mounted a pair of sleeve valve members. The sleeve valve members each have a gear surface formed thereon which meshes with a common gear member. The gear connection provides for equal but opposite rotation of the sleeves. The central spool distributes fluid to the sleeves from which the fluid is directed to a signal valve which is selectively positioned by the operation condition of a steer-by-driving transmission. The signal valve is operable to distribute fluid to a control mechanism for a variable displacement hydrostatic steer unit which is operable to cause steerage of the vehicle.

It is an object of this invention to provide an improved steer valve for a steer-by-driving transmission wherein one portion of the steer valve provides steer signals when forward vehicle operation is occurring and another portion of the steer valve provides steer signals when reverse operation is occurring, and also wherein the two portions of the steer valve are operatively interconnected by a gearing mechanism.

It is another object of this invention to provide an improved steer valve servo mechanism and control for a track laying vehicle having a steer-by-driving transmission including a variable displacement hydrostatic steer mechanism, wherein a steer valve has a forward valve portion and a reverse valve portion which are rotatably mounted on a distribution valve member and interconnected by gear members for equal but opposite rotation in response to operator input, and wherein each forward and reverse valve portion directs a steer signal to a signal valve which is responsive to the selected direction of vehicle travel to direct the proper steer signal to the hydrostatic steer mechanism, and further wherein operation of the hydrostatic steer mechanism results in rotation of the distribution valve member to discontinue the steer signal.

DESCRIPTION OF THE DRAWINGS

FIG. 1 is a diagrammatic and schematic representation of a control mechanism depicting an exemplary embodiment of the invention.

FIG. 2 is a view taken along line 2—2 of FIG. 1.

FIG. 3 is a view taken along line 3—3 of FIG. 1.

DESCRIPTION OF THE PREFERRED EMBODIMENT

Referring to the drawings and particularly FIG. 1, there is seen a steer control valve mechanism generally designated 10, having a centrally disposed distributor valve 12 rotatably mounted in a forward steer sleeve valve 14 and in a reverse steer sleeve valve 16. The sleeve valves 14 and 16 are coaxial.

The sleeve valve 14 has a gear surface 18 which faces a gear surface 20 formed on the sleeve valve 16. These gear faces 18 and 20 are interconnected by gear members 22 which are rotatably mounted in a housing, shown in phantom at 24. The sleeve valves 14 and 16 are also rotatably mounted in the housing 24.

The distributor valve 12 has a shoulder 26 adjacent the right end thereof which abuts the sleeve valve 16 and a pin extension 28 which extends through the left end of sleeve valve 14. The sleeve valve 14 is prevented from leftward movement along the distributor valve 12 by a lock washer 30 or other appropriate fastener. This structure does not impede the rotary movement of the sleeve valve 14 relatively to the distributor valve 12.

As seen in FIGS. 2 and 3, the distributor valve 12 has an essentially X-shaped cross section, the purpose of which will become more apparent later. As seen in FIG. 2, the sleeve valve 14 has formed therein a plurality of fluid passages 32, 34 and 36. Each of these passages has diametrically opposite thereof a passage 32a, 34a and 36a, respectively. There are also formed in the sleeve valve 14, a pair of exhaust passages 38, 38a.

As seen in FIG. 3, the sleeve valve 16 has formed therein fluid passages 40, 42 and 44, and respective oppositely disposed passages 40a, 42a and 44a. The sleeve valve also has formed therein a pair of exhaust passages 46, 46a. The passages 32, 34, 36, 40, 42 and 44 and their oppositely disposed counterparts communicate with grooves 50, 52, 54, 56, 58 and 60, respectively. As seen in FIG. 1, these grooves are formed in the outer peripheral surface of the sleeve valves 14 and 16.

As seen in FIGS. 2 and 3, rotation of the sleeve valve 14 in a clockwise direction will result in communication between passages 34 and 32, 36 and 38, 32a and 34a, 36a and 38a, through the valleys formed by the X-shaped cross section of the distributor valve 12. The clockwise rotation of sleeve valve 14 will cause counterclockwise rotation of sleeve valve 16. The X-shaped cross section of distributor valve 12 will permit communication between passages 42 and 44, 40 and 46a, 44a and 42a, 40a and 46. The opposite or counterclockwise rotation of valve spool 14 will permit communication between the pairs of passages such as 34 and 36, 32a and 38. This rotation of sleeve valve 14 will cause clockwise rotation of sleeve valve 16 so that communication between other passage pairs such as 42 and 40, 46 and 44 will occur. As will become more apparent later, the rotary movement of the sleeve valves 14, 16 permits selective pressurizing and exhausting of the passages formed therein.

The grooves 52 and 58 are in fluid communication with a control pressure inlet passage 62 which receives fluid under pressure from a conventional hydraulic pressure source and control mechanism 64. The control pressure source 64 will include at least a conventional positive displacement hydraulic pump and a conventional pressure limiting valve.

The grooves 50 and 54 communicate with a left forward steer passage 66 and right forward steer passage 68, respectively. The grooves 56 and 60 communicate with a left reverse steer passage 70 and a right reverse steer passage 72, respectively. The passages 66, 68, 70 and 72 are each disposed in fluid communication with a portion of the housing 24. This portion of the housing 24 has formed therein a bore 74 in which is disposed a signal valve, generally designated 76. The signal valve 76 has a sleeve member 78 fitted in the bore 74. Slidably disposed in the sleeve 78 is a spool valve 80 having three equal diameter spaced lands 82, 84, 86. Also slidably disposed in the spool valve 78 is a signal plug valve 88. The spool valve 80 is urged downward, as viewed in FIG. 1, against the plug valve 88 by a compression spring 90.

The sleeve 78 has formed therein a plurality of fluid ports 92, 94, 96, 98, 100, 102, 104 and 106. These ports are in fluid communication with right forward steer passage 68, a displacement control passage 108, left reverse steer passage 70, left forward steer passage 66, a displacement control passage 110, right reverse steering passage 72, a reverse signal passage 112 and an exhaust passage 114, respectively.

The reverse signal passage 112 will be pressurized by a transmission reverse signal 116 whenever the transmission, not shown, is shifted to reverse. The transmission and its control is a conventional assembly. The use of reverse pressure signals as a control function is well-known and those skilled in the art will recognize the many conventional ways the signal can be received from the transmission control and directed to a control valve. This reverse signal is ported to the lower end of plug valve 88 such that when reverse operation is undertaken, the plug valve 88 and spool valve 80 will be moved against the spring 90 to a reverse position.

In the spring set position of the valve spool 80, the ports 92 and 94 are in fluid communication while the ports 98 and 100 are in fluid communication. The remaining steer passages 70 and 72 are blocked by the lands 84 and 86, respectively. The exhaust passage 114 prevents pressure build-up between the spool valve 80 and plug valve 88, such that inadvertent shifting of the spool valve 80 will not occur. In the forward position shown, the right forward steer passage 68 and left forward steer passage 66 are in fluid communication with the displacement control passages 108 and 110.

Assuming that the vehicle is moving forward and the operator desires a steer maneuver to occur, the operator will rotate a steer input represented by a box at 118. This steer input will result in rotation of the sleeve valve 14 and due to the gear members 22, opposite rotation of the sleeve valve 16. Assuming a right turn is undertaken, the sleeve valve 14 will be rotated such that passage 68 will be placed in fluid communication with passage 62, as seen in FIG. 2, and therefore displacement control passage 108 will be pressurized causing the hydrostatic unit to change displacement so that a steer input is established in the transmission.

As the hydrostatic unit changes displacement, a steer feedback signal 120 is imposed on the distributor valve 12 causing rotation thereof. This, of course, is a typical servo feedback loop, the operation of which is well-known. When the sleeve valve 14 reaches the desired operator input vehicle steerage, change in displacement of the hydrostatic unit will occur until the steer feedback unit 120 has moved sufficiently to cause the distributor valve 12 to block further fluid communication between the passages 62 and 68. As is well-known, the time lag between operator input at sleeve valve 14 and feedback response at valve 12 is almost imperceptible.

If a left steer maneuver is required during forward operation, the sleeve valve 14 is rotated in the opposite direction such that displacement control passage 110 is pressurized while displacement control passage 108 is exhausted. The steering maneuver and feedback is similar to that described above for a right forward steer.

If the transmission is being operated to provide reverse vehicle movement, the spool valve 80 will be shifted longitudinally against the spring 90 such that passage 68 will be blocked by land 82 and passage 66 will be blocked by land 84. In this position of the valve spool 80, left reverse steer passage 70 will be in fluid communication with displacement control passage 108 and right reverse steer passage 72 will be in communication with displacement control passage 110. The steer input maneuver at 118 will be the same for a right turn, however the opposite rotation of sleeve valve 16 will cause the passage 72 to be pressurized from passage 62 which in turn will result in pressurization of displacement control passage 110 and exhausting of displacement control passage 108. A left steer maneuver during reverse operation will cause passage 70 to be pressurized with the appropriate pressurization and exhausting of the displacement control passages 108 and 110, respectively.

It will be noted that for a forward right steer, passage 108 is pressurized. However, for a reverse right steer, passage 110 is pressurized. This change in pressurization is required due to the operating characteristics and mechanical connections within the steer-by-driving transmission.

As pointed out earlier in the specification, the prior art devices have utilized operator steer valve mechanisms which were interconnected by linkages to provide this changeover function. These devices do not provide the compactness and efficient operation of the current device.

It will be appreciated with the subject invention that the valve housing 24 will need but a single bore to accommodate the steer valve mechanism. The gearing interconnecting the sleeve valve gearing is disposed in an environment which is closed from atmosphere and therefore alleviates any problems with dirt and continuing maintenance which might occur with external linkages.

The embodiments of the invention in which an exclusive property or privilege is claimed are defined as follows:

1. A steer valve servo mechanism in a steer-by-driving vehicle having a steering system with a variable displacement hydrostatic mechanism including servo steer means and feedback connection means, said steer valve servo mechanism comprising: a housing; fluid passages in said housing including forward steer passage means and a reverse steer passage means; a forward steer sleeve valve means rotatably supported in said housing; reverse steer sleeve valve means rotatably supported in said housing coaxial with said forward steer sleeve valve means; gear means connecting said forward steer sleeve valve means and said reverse steer sleeve valve means for imposing opposite rotation thereto; operator steer input means for selectively rotating one of said steer sleeve valve means; distribution valve means rotatably supported in both said steer sleeve means; means connecting said distribution valve means to the feedback connection means for rotating said distribution valve in response to a change in the displacement of the hydrostatic mechanism; passage means in said forward steer sleeve valve means for receiving fluid from said forward steer passage means when said vehicle is traveling forward and cooperating with said distribution valve means for delivering fluid to said servo steer means for urging a change in displacement of said hydrostatic means; and passage means in said reverse steer sleeve valve means for receiving fluid from said reverse steer passage means when said vehicle is traveling in reverse and cooperating with said distribution valve means for delivering fluid to said servo steer means for urging a change in displacement of said hydrostatic means.

* * * * *